United States Patent [19]

Rentsch et al.

[11] Patent Number: 5,211,708
[45] Date of Patent: May 18, 1993

[54] FIBER BALE OPENING APPARATUS

[75] Inventors: Alfred Rentsch, Kradolf; Daniel Hanselmann, Winterthur; Jürg Faas, Dinhard, all of Switzerland

[73] Assignee: Maschinenfabrik Rieter AG, Winterthur, Switzerland

[21] Appl. No.: 650,093

[22] Filed: Feb. 4, 1991

[30] Foreign Application Priority Data

Feb. 2, 1990 [DE] Fed. Rep. of Germany ....... 4003110

[51] Int. Cl.⁵ .................. D01G 7/00; B65G 25/00
[52] U.S. Cl. .................... 19/80 R; 19/97.5; 198/774.1; 198/774.2
[58] Field of Search ............ 19/80 R, 97.5; 198/750, 198/774.1, 774.2

[56] References Cited

U.S. PATENT DOCUMENTS

| | | |
|---|---|---|
| 3,537,143 | 11/1970 | Merck . |
| 3,897,018 | 7/1975 | Wilkes et al. ............ 19/80 R |
| 3,971,103 | 7/1976 | Ono et al. ............... 19/80 R |
| 4,071,137 | 1/1978 | Fink . |
| 4,184,587 | 1/1980 | Hallstrom ............... 198/750 |
| 4,395,183 | 7/1983 | Wirholm et al. ......... 198/750 |
| 4,497,085 | 2/1985 | Van Doorn et al. . |
| 5,044,045 | 9/1991 | Demuth et al. .......... 19/80 R |

FOREIGN PATENT DOCUMENTS

| | | |
|---|---|---|
| 0327885 | 8/1989 | European Pat. Off. . |
| 386580 | 9/1990 | European Pat. Off. ....... 19/80 R |
| 2027965 | 12/1971 | Fed. Rep. of Germany . |
| 839900 | 6/1981 | U.S.S.R. ...................... 198/750 |
| 919948 | 4/1982 | U.S.S.R. ...................... 198/750 |
| 2023078 | 12/1979 | United Kingdom . |
| 2031961 | 4/1980 | United Kingdom ........ 19/80 R |

*Primary Examiner*—Clifford D. Crowder
*Assistant Examiner*—Michael A. Neas
*Attorney, Agent, or Firm*—Burns, Doane, Swecker & Mathis

[57] ABSTRACT

A fiber bale opening machine having an inclined opening roller (1) is provided with conveying apparatus (100) for stepwise displacement of fiber bales in the direction of the opening roller. The roller is movable transversely with respect to the direction of the displacement. The conveying apparatus includes at least one stationary support for supporting the bale and at least one shifting device for performing a repetitive movement cycle starting from an initial position and returning back to it. In the initial position, the lifting device is lower than the stationary support and the bale is supported on such support. Later the lifting device moves up to take over support of the bale and during this time it shifts in the direction of intended bale displacement.

33 Claims, 5 Drawing Sheets

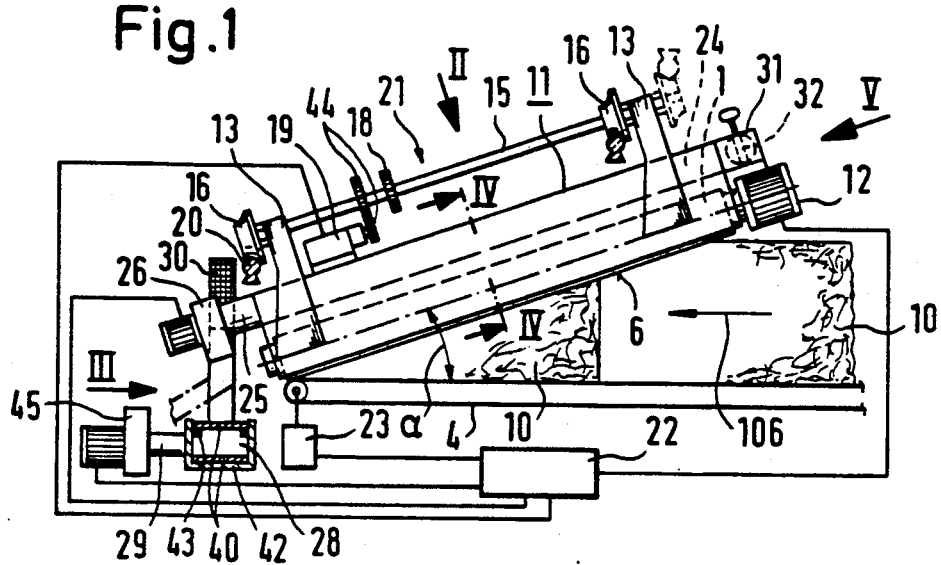
Fig.1
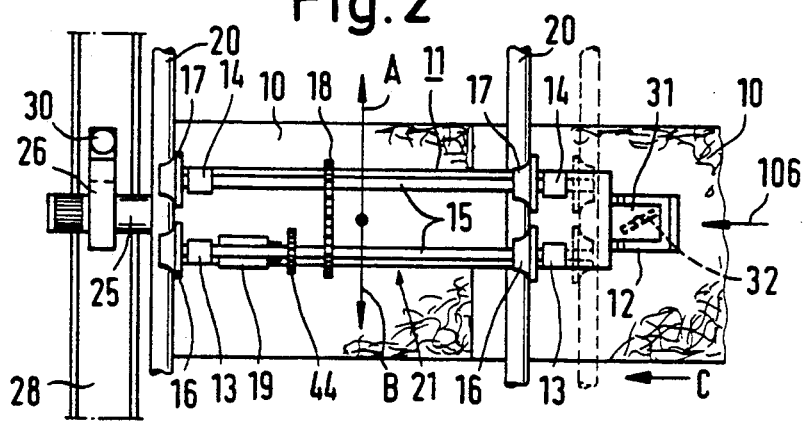
Fig.2
Fig.4
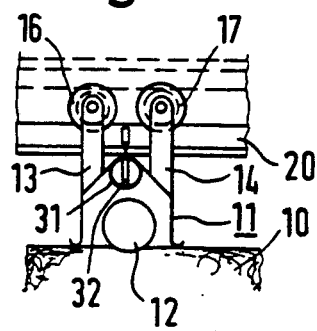
Fig.5
Fig.3
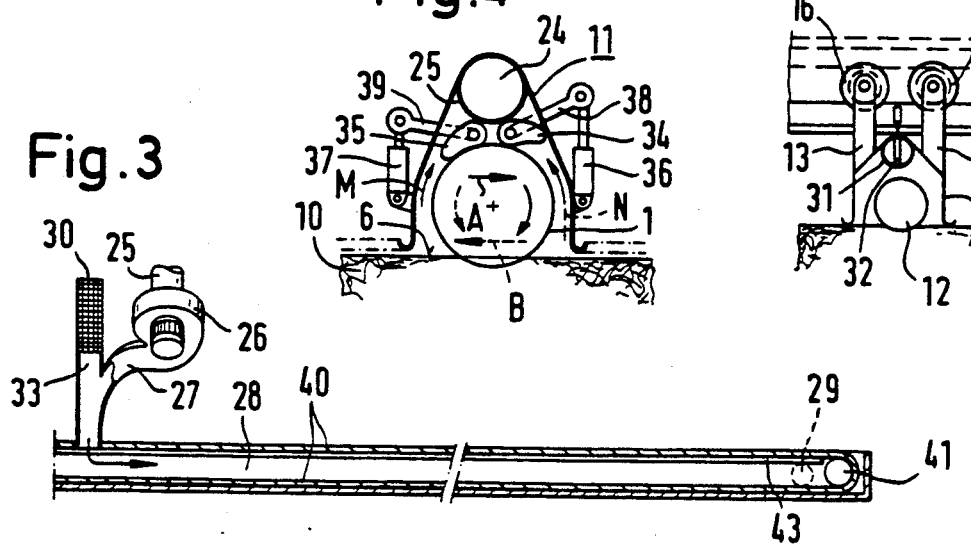

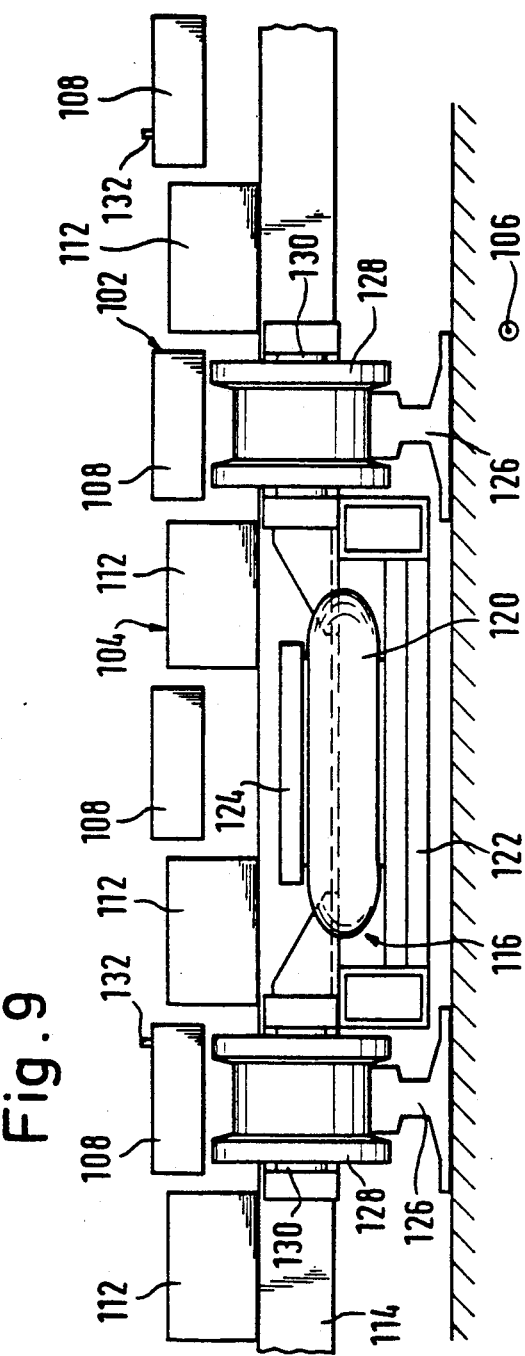
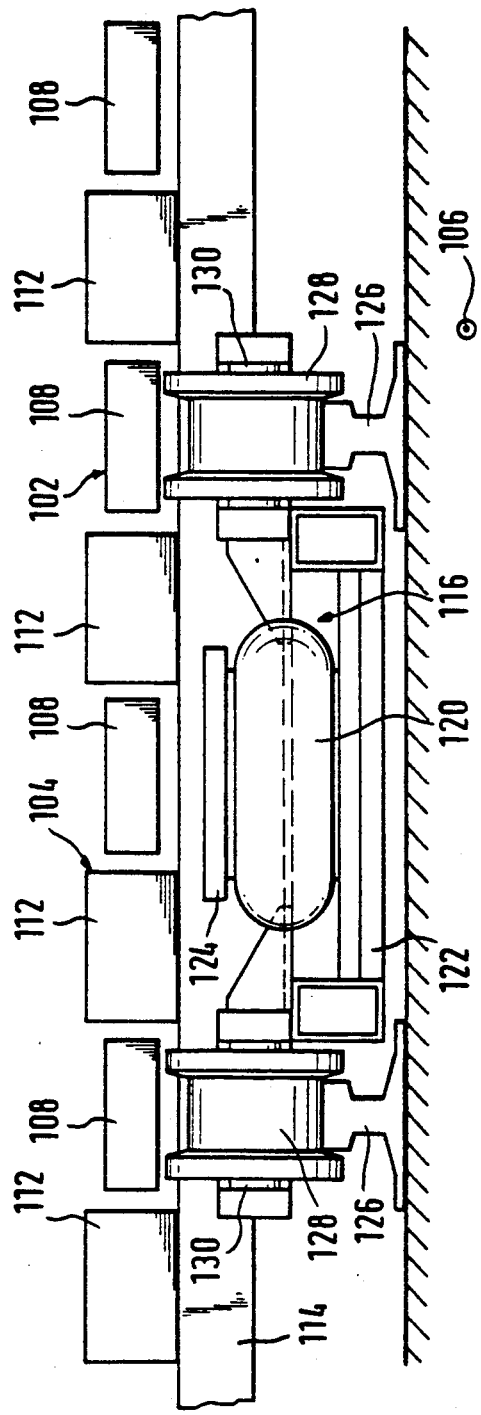

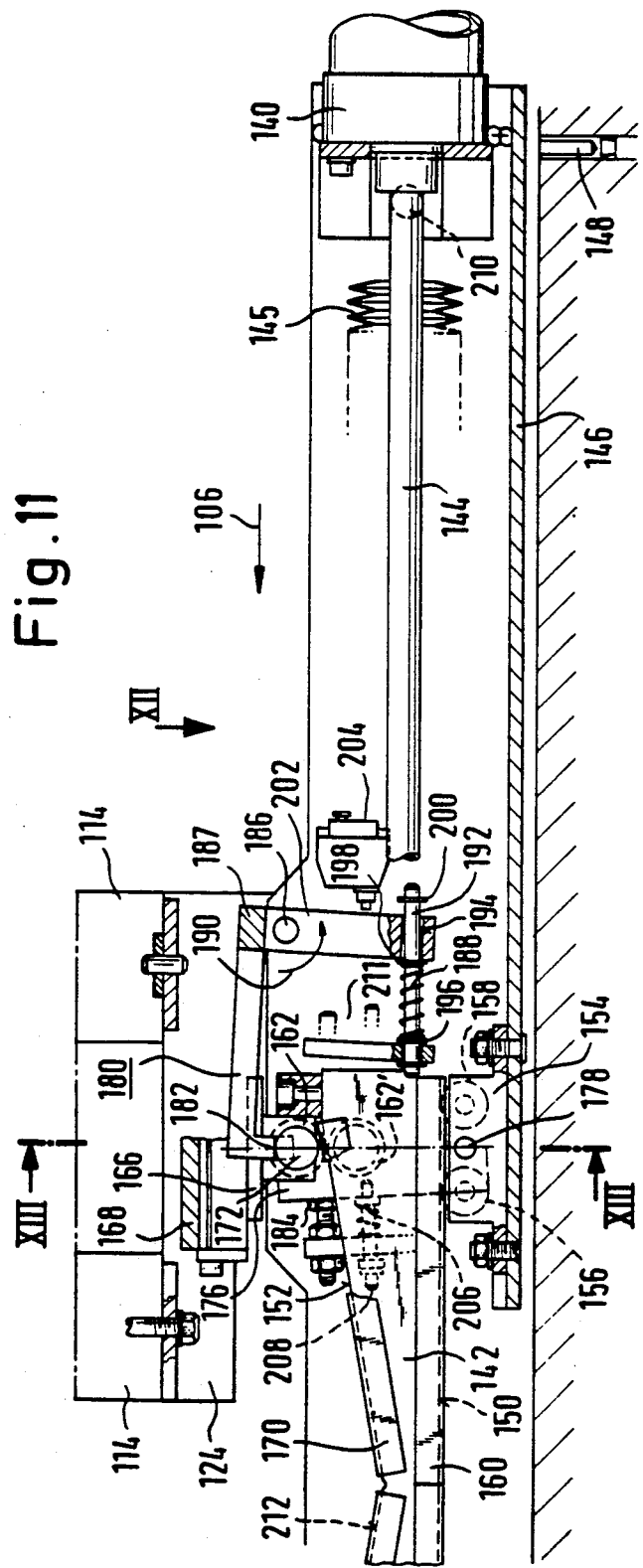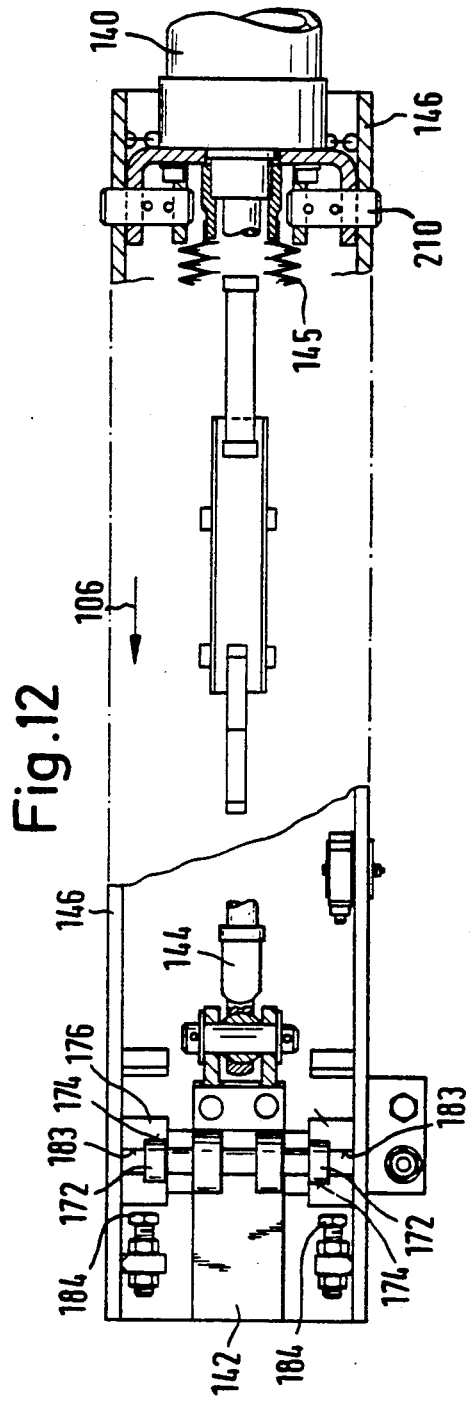

FIBER BALE OPENING APPARATUS

FIELD OF THE INVENTION

The present invention relates to the opening of bales of fibers, such for example as conventioned cotton bales configured as rectangular parallelepipeds. It is concerned particularly with conveying apparatus for stepwise displacement of fiber bales in the direction of an opening roller of a bale opening machine.

BACKGROUND

Swiss patent application CH 00834/89-7 discloses bale opening apparatus which includes an opening roller having its axis extending lengthwise with respect to a row of bales to be opened and being inclined downwardly toward an end of the row. In the bale opening machine proposed in this Swiss patent application the bales are pushed forward step-by-step to be cut away by the opening roller, and the opening roller is moved transversely with regard to the direction of movement of the bales to traverse across the widths of the bales. Several arrangements are possible. For example, several rows of bales may be disposed side-by-side or one above the other, and several inclined opening rollers may be used to open the bales in such rows.

The inclined opening of fiber bales has the specific advantage that the material is simultaneously opened from all areas of the bales so that a more or less constant amount is opened per time unit. The amount is, to a large extent, independent of the respective distribution of densities within the fiber bales. Therefore, the depth of the opening action to be accomplished during a pass of the opening roller transversely across the row of bales may be set on the basis of the amount of flocks to be cut away per time unit and may be kept constant from pass to pass of the roller. According to this proposal, the depth to be opened is establishing by the distance the row of bales is pushed forward toward the inclined opening roller in predetermined steps.

The conveying apparatus which performs the stepwise displacement of the fiber bales according to this former proposal is in the form of a revolving conveyor belt. Although such an arrangement is possible, it leads to relatively high costs, as the fiber bales to be displaced are relatively heavy and movement of the row of bales against the direction of intended displacement must be prevented because of the forces exerted by the opening roller on the front bales during the process of opening.

Such equipment can be constructed so that the apparatus is stable despite relatively low production costs and is reliable in day-to-day operation. The step length of the stepwise displacement may be set to a fixed value or adjusted variably without making the system excessively expensive, and the danger of the bale being pushed back during the opening process due to the forces prevailing during such process is effectively minimized.

Moreover, multiple units of such a conveying apparatus may be used in arrangement of modular design. The modules may be placed in several rows and various lengths side-by-side or behind each other depending on the size and the design of the bale opening machine.

SUMMARY OF THE INVENTION

According to the invention, a bale opening machine is provided with conveying apparatus that includes bale supporting and shifting means made up of cooperating first and second bale supports moveable cyclically relative to one another. During one time interval in a cycle, the bale is supported by the first bale support and the second bale support is not effective for positioning the bale. During another time interval in a cycle, the bale is supported at least predominantly by the second bale support and this second bale support is shifted to advance the bale carried thereby in the desired conveying direction. In one form of apparatus in accordance with the invention, the bale conveying system includes at least one stationary supporting member for supporting the fiber bale, as well as at least one shifting device. The shifting device is designed for performing a repetitive movement cycle starting out from an initial position and returning back to said position. The initial position is lower than (or at least at approximately the same height as) the bale supporting surface of the supporting member. The movement cycle comprises a first section directed upwards and forwards and a second such section directed downwards and backwards.

Because the bales rest on the stationary supporting members during the individual steps, they ordinarily are sufficiently protected against displacement away from the opening roller. Additionally, the shifting device may be composed of relatively few components without requiring massive and heavy swiveling axles and rollers, as is the case in a revolving conveyor belt. If longer paths of movement are necessary, e.g. when bringing up new bales upon a change of fiber bale types, such longer paths of movement may be simply performed by several successive steps. Due to the fact that the individual steps are kept relatively small, e.g. within a range of between 1 millimeter and 50 millimeters, it is possible to work with an actuating means whose length of stroke is also limited so that expenditure is kept down here also.

The conveying apparatus in accordance with the invention is also able to return the bales simply by reversing the movement cycle.

A single supporting member would be sufficient, in principle, to work with, but it would then be necessary to provide two shifting devices on the two sides of the supporting member. It is preferable in a practical arrangement to provide a device with a plurality of supporting members which are arranged parallel to each other and which form a grate. Said grate may inexpensively be constructed by oblong profiles and is, nevertheless, stable enough to carry the weight of the fiber bales. By providing distances between the individual carriers, a reduction in weight, and thus in material, is achieved. Furthermore, by aligning the oblong profiles parallel to the direction of displacement of the fiber bales, a guiding means for the displacement of said bales is achieved, because the profile members slightly press into the bale's flock mass and thus form guiding grooves of a sort in the fiber bale.

The shifting device preferably comprises a carrier which carries the fiber bales during the forwardly directed section of the stepwise shifting movement. For this purpose the carrier preferably consists of a second grate, the rods of which are arranged between the supporting members of the first grate.

It is possible to arrange the shifting device with at least one lifting device which serves for lifting or lowering the carrier or the second grate, respectively. Four preferably synchronized lifting devices, for example, may be arranged below the fiber bale on the corners of a rectangle, the area of which is, when viewed from above, slightly smaller than that of the rectangular shape of the fiber bale. This ensures the stability of the second grate against deflection whilst maintaining reasonable dimensions of the carrier.

The shifting device may comprise a shifting mechanism which operates fully independently from the lifting device(s). This enables a clear separation between, on the one hand, the lifting and lowering movements and, on the other hand, the shifting and returning movements, thus enabling inexpensive designs. For example, the lifting device(s) may consist of an inflatable bellows arranged on a rolling carriage and supporting the carrier, and the shifting mechanism can act either upon the carriage or upon the carrier or upon the second grate, respectively. An inflatable bellows constitutes an inexpensive form of lifting device. By selecting a sufficiently dimensioned lifting area, a bellows may be operated with relatively small pressure burdens.

An inexpensive shifting mechanism for use with a bellows type lifting device may be in the form of an extendable and retractable air cylinder or may comprise a preferably electrically driven threaded spindle with a ball nut. Since such shifting mechanisms are usually designed for longer displacements, it is advantageous here to arrange the mechanism to act upon the carriage or the second grate via a step-down gear, so that the shifting forces exerted by the shifting mechanism may be kept relatively small to permit use of a small mechanism of inexpensive design. Since the carrying force necessary for the fiber bales is borne by the rolling carriage, the shifting forces to be exerted by the shifting mechanism are relatively small. This also contributes to the feasibility of compact and inexpensive shifting device designs.

The invention also contemplates another inexpensive form of conveying apparatus wherein a shifting device is integrated with a lifting device. For example, the shifting device(s) may include a movable wedge arranged so that the wedge causes the lifting or the lowering of the carrier and the longitudinal movement of said wedge is used for performing the displacement of the fiber bales. This can be achieved concretely in a construction where the wedge cooperates with a roller guided in the vertical direction in a fixing device; where said roller lifts a carrier (or a second grate) for lifting the bale; where said fixing device is swivellably mounted around an essentially horizontal axis extending laterally to the direction of the displacement; and where a catch releases the fixing device for performing a tilting movement of the carrier (or the second grate) in the direction of the displacement only after having reached the top end of the lifting movement.

This arrangement may be put into practice with relatively few components and usually works very reliably in day-to-day operations. It is particularly preferable to design the arrangement in such a manner that the fiber bale's weight, which is directed downwards, comprises a component in the shifting direction due to the inclination of the wedge surface. This results in a turning moment about the horizontal axis and causes a tilting movement by the fiber bale's weight alone, with a minor loss in potential energy. The required amount of energy for this tilting movement is relatively small so that the lowering movement of the fiber bale is negligibly small and does not have any distorting effects.

In this arrangement the wedge unit preferably is in the form of a double wedge with oppositely slanted wedge areas. One wedge area ensures the displacement in the shifting direction and the other wedge area the movement in the opposite direction. The oppositely slanted wedge areas are preferably inclined in the form of a "V" so that the "switch-over" from steps in the shifting direction to the steps in the opposite direction takes place when the fiber bale's weight does not rest on the carrier. The tip of the V-shaped recess, which forms the place of the "switch-over", is equivalent to the lowered position of the carrier, i.e. a position in which the weight of the bale is borne by the supporting member, i.e. the first grate.

In accordance with the invention one or several stops may be provided in order to limit the tilting movement of the fixing device and thus also the step length of the shifting movement. For reasons of practicality, one may also provide at least one stop that is adjustable so as to make the step length adjustable.

A readjusting device is preferably provided for setting back the fixing device (and consequently the carrier or second grate, respectively) to the locked position after performing the tilting movement and the lowering the carrier or the second grate, respectively. Said readjusting device may include one or several springs. Because the readjustment takes place after lowering the carrier, the readjustment force requires only a relatively small spring.

In all of these embodiments, the conveying apparatus may be rectangular in shape when viewed from above. This allows the arrangement of several similar conveying apparatuses either side-by-side or successively in a row for forming the bale feeding device of a bale opening machine. This fulfills a desire for a conveying means of modular design.

It is also possible to provide only the first conveying apparatus of each row with the facility for a return movement of the bale resting on it, because in practical operations, the return movement of the fiber bale is desired only when the opening roller moves past a certain row of bales without opening anything in this specific row. The return movement of the front bale prevents the opening roller from carrying off any protruding flocks.

BRIEF DESCRIPTION OF THE DRAWINGS

Preferred embodiments of the invention will now be described by way of example with reference to the accompanying drawings in which:

FIG. 1 is a schematic side view of a bale opening machine for oblique opening of bales;

FIG. 2 is a view of the bale opening machine of FIG. 1 looking down in the direction of arrow II in FIG. 1;

FIG. 3 shows a part of the apparatus of FIG. 1 as seen in the direction of view III in FIG. 1;

FIG. 4 is a cross-section through the apparatus of FIG. 1 along the plane IV—IV;

FIG. 5 shows a part of the apparatus of FIG. 1 as seen in the direction of view V in FIG. 1;

FIG. 9 is a magnified display of one of the lifting devices of FIG. 7 as seen in the direction of arrow IX, said device being displayed in the lowered position;

FIG. 10 is a view similar to FIG. 9, but showing the lifting device in its lifted position;

FIG. 11 is a side view of a second embodiment of a conveying apparatus constructed in accordance with aspects of the present invention for use in the bale opening machine of FIG. 1;

FIG. 12 is a top view in the direction of arrow XII in FIG. 11;

DETAILED DESCRIPTION OF PREFERRED EMBODIMENTS

Figure 8:
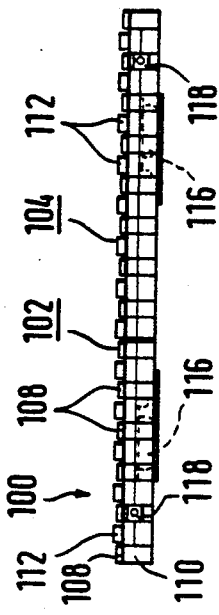
FIG. 8 is a frontal view in the direction of arrow VIII of the conveying apparatus of FIG. 6.

FIG. 1 depicts a bale opening machine having an opening member 21 in which a toothed opening roller 1 is rotatably and driveably held in a casing 11. The opening roller 1 is rotatably driven by an electric motor 12 fixedly attached to casing 11.

Casing 11 is further provided with two pairs of carriers 13 and 14. Two wheel shafts 15 are rotatably mounted and secured against axial displacement in respective ones of the carriers 13 and 14. Profiled wheels 16 and 17 are fixedly attached to shafts 15 and guided on a pipelike guiding track 20 for moving casing 11 in the directions of movement A and B.

One of shafts 15 is driven by motor 19 via toothed wheels 44, while the other shaft 15 is driven from the first shaft 15 through a suitable connection 18 such as a chain and sprocket connection. Motor 19 is itself fixedly attached to casing 11.

Bales 10 of fibers (e.g. cotton fibers) may be convention bales shaped generally as rectangular parallelepipeds. They are disposed in a row on and supported by a conveying apparatus depicted schematically in FIG. 1 at 4. This conveying apparatus is actuated by means 23 such as a motor to advance the bales 10 toward the opening roller 1. Control means 22 is provided to control motors 12, 19 and 23.

Above toothed roller 1, casing 11 provides a loose stock conveyor pipe 24 (see also FIG. 4), the output 25 of which is connected to a ventilator 26. This ventilator 26 is, as can be seen in the Figures, arranged as a radial ventilator and leads to a bend 27 which advances the conveyed fibrous flocks to a pneumatic conveying channel 28. Conveying channel 28 is connected via a pipe 29 to a ventilator 45 which conveys the fibrous flocks to the next processing stage (not shown here).

A proper balance between ventilator 26 and ventilator 45, which is connected behind said pipe 29, is achieved by means of a balancing filter 30. For controlling the air flow rate through the loose stock conveyor pipe 24, a butterfly valve 32 is provided on its entry side 31. The balancing filter 30 is itself connected to a filter nozzle 33 which is attached to bend 27, thus bringing about a connection between the interior space of bend 27 and balancing filter 30.

As a further embodiment of the invention, ventilator 26 may be dropped so that the fibrous flocks are conveyed by the air stream produced by ventilator 45. A possible disadvantage of such a solution may reside in the fact that, under certain circumstances, disadvantageously higher vacuum might prevail in channel 28.

However, this solution also has the material advantage of the simpler and more inexpensive design, as filter 30 and ventilator 26 may be dropped.

From FIG. 4 it can be seen that in casing 11, between the toothed roller 1 and the loose stock conveyor pipe 24, flaps 34 and 35 are provided for allowing, alternatingly and depending on the rotating direction of toothed roller 1, the conveyed air with the fibrous flocks therein to pass into the loose stock conveyor pipe in either the conveying direction M or N. From the example in FIG. 4 it can be seen that when toothed roller 1 turns clockwise and the opening member moves in direction A, the conveyed air with the fibrous flocks takes the direction M. Oppositely, the fibrous flocks move in the direction N when the toothed roller rotates counter-clockwise and the opening member opens the flocks from the opening area 6 in direction B.

Flap 34 is activated by pneumatic cylinder 36 and flap 35 by pneumatic cylinder 37. Each of these cylinders is swivellably attached to casing 11 and swivellably attached to a swiveling lever 38 or 39. Swiveling levers 38 and 39 are each attached to the respective flaps 34 or 35, respectively, in a torsionally fixed manner.

In order to receive bend 27, which is moved back and forth in the directions A and B, conveying channel 28 comprises a continuous belt 40 which turns around a deflection roller 41 (only one is to be seen in FIG. 3) at both ends of conveying channel 28. The connecting pipe 29 (FIGS. 1 and 3) is connected to conveying channel 28 between the two deflection rollers.

As can be seen in FIG. 1, conveying channel 28 is in the form of a U-shaped trough 42 and continuous belt 40 moves in said trough. In order to prevent the continuous belt 40 from being sucked inwardly by the vacuum prevailing in channel 28, belt 40 is supported by sliding rails 43.

During operation, the opening member 21 is caused by control 22 to perform the back and forth movements A and B. Simultaneously, the fiber bales are guided towards the opening member in one step (e.g. of 2 to 5 millimeters in length) in direction C so that toothed roller 1 is in position to extract flocks from the bale surface 6 to be opened and to pass said flocks on to the conveying channel 24.

The present invention is concerned particularly with a special kind of conveying apparatus 4. Swiss Patent Application CH 00834/89-7 discloses a fiber belt moving in a closed path for advancing a fiber bale toward an opening roller, but the present invention envisions the use of other types of conveying apparatus.

Figure 6:
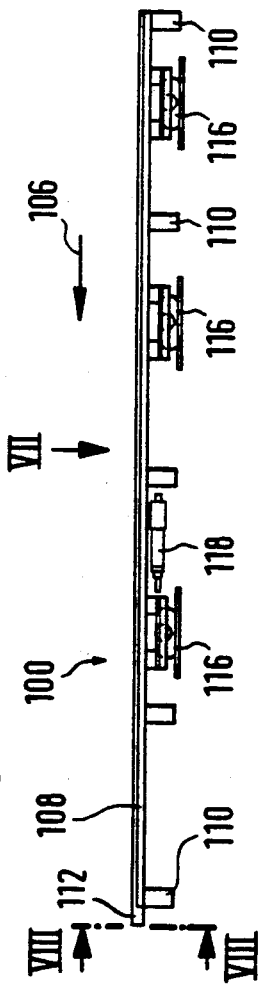
FIG. 6 is a side view of a first embodiment of a conveying apparatus constructed in accordance with aspects of the present invention for use in the bale opening machine of FIG. 1.

A first embodiment of the conveying apparatus in accordance with the invention is shown in FIGS. 6 to 10. Here the rectangularly shaped conveying apparatus 100 (FIG. 7) includes a first grate 102 and second grate 104. Said first grate 102 comprises a plurality of rods 108 which are arranged in the direction 106 of intended displacement of the fiber bales. The rods 108 are generally parallel to one another and are attached to the floor by means of short pipe sections 110. As can be seen in FIG. 6, in this example five such pipe sections 110 are provided for each longitudinal rod 108 of first grate 102.

A second grate 104 also comprises generally parallel, mutually spaced-apart rods 112 extending in the direction 106 of intended bale displacement 106. Each of these rods 112 has a lateral dimension which is less than the clear distance between two adjoining longitudinal rods 108 of said first grate. Said rods 108 have a lateral dimension which is less than the clear distance between adjoining rods 112 of the second grate 104. This enables an interdigitated or interlocking arrangement of the rods 108 and 112 of the two grates, as is displayed in FIGS. 7 and 8.

Figure 7:
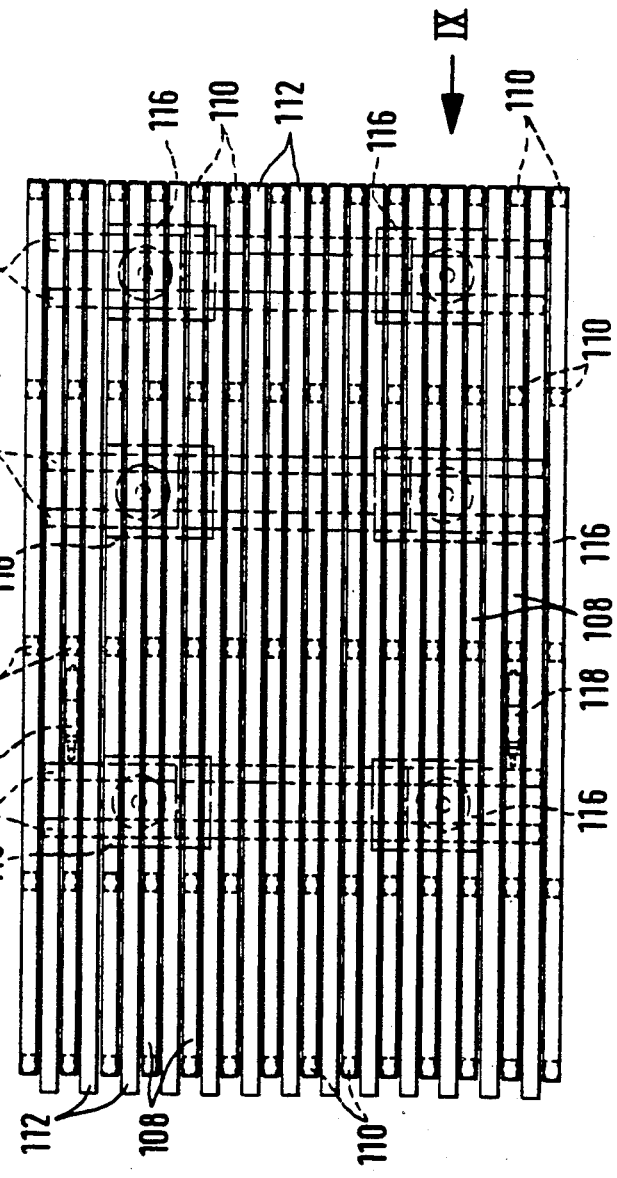
FIG. 7 is a top view of the conveying apparatus of FIG. 6 in the direction of arrow VII.

The second grate 104 is movable in the vertical direction and in the direction of displacement 106 relative to the stationary first grate 102, as is described in detail below. In order to connect the longitudinal rods 112 of the second grate and to thus form a carrier, six transversal bars are provided below longitudinal rods 112, said bars being arranged in pairs below said rods 112. Furthermore, said bars are intended for transmitting to the rods 112 the lifting force of six lifting devices 116 spread over the area of the conveying apparatus. As can be seen, each pair of transversal rods 114 is provided with two lifting devices 116 located at a distance from one another. All told, the lifting devices 116, as can be seen from FIG. 7, are distributed over the area of the second grate 104 in such a manner that a reasonable distribution of the lifting forces over the area of the second grate is achieved and noticeable deflections of individual components of the second grate as a result of the exerted forces are prevented.

For the purpose of displacing the second grate in the direction of displacement 106 or when returning the fiber bales in the opposite direction, two air cylinders 118 are provided. These cylinders (shown in FIGS. 6, 7 and 8) act upon the rear rod of the front transverse pair of rods 114. The rear ends of the air cylinders 118 are fixedly attached to the stationary first grate 102 or to the ground.

Lifting means 116 and the shifting mechanism formed by the air cylinders 118 together form a shifting device which allows the stepwise displacement of the fiber bale(s) on the conveying apparatus. Such displacement may take place either in the direction of displacement 106 or, when returning the fiber bale(s), in the opposite direction.

If a displacement in the direction of arrow 106 is desired, lifting means 116 is first activated in order to lift the second grate 104 from a position below the supporting area of first grate 102 to an elevated position in accordance with FIG. 8. Then the air cylinders 118 are extended in order to effect the necessary shifting movement of the second grate 104 relative to the first stationary grate 102. After performing this step, the lifting means 116 is relieved and the second grate 104 thereupon descends below the supporting area of first grate 102 so that the weight of the fiber bales is more or less exclusively carried by the first grate 102. Subsequently, air cylinders 118 are retracted and the second grate moves back to its initial position. The fiber bale, now supported on the first grate, is however located one step farther forward than before the movement cycle took place. Further feeding steps are performed by repeating the shifting cycle.

If a return of the fiber bales is desired, the cycle only needs to be performed the other way round, i.e. at first air cylinders 118 are extended, the lifting devices 116 thereupon lift the second grate 104, the air cylinders 118 are retracted and lifting device 116 is activated in order to achieve the descent of the second grate below the supporting area of the first grate, thus bringing back the shifting device and the second grate to their initial positions and moving the fiber bales located on the conveying apparatus one step backwards. This return cycle may be performed several times in order to achieve longer displacements of the fiber bales.

FIGS. 9 and 10 show the detailed arrangement of the conveying apparatus in the area of the lifting device 116. In FIGS. 9 and 10 the lifting device 116 comprises an air cushion or a bellows 120 which is filled or evacuated by a source of compressed gas via a pipe not displayed here. Thus the inflatable bellows 120 has an evacuated or partially evacuated position shown in FIG. 9, and a filled position displayed in FIG. 10. The lower side of bellows 120 is attached (for example, by welding) to a rolling carriage 122. On its upper side it presses against the lower side of a plate 124 attached (for example, by welding) to a pair of transverse rods 114. Thus, inflation of bellows 120 leads to a lifting of the second grate 104 so that this grate takes up a position in accordance with FIG. 10.

Below the conveying apparatus there are two tracks 126 extending in the direction of displacement. These tracks are arranged on both sides of carriage 122 and are attached to the floor. The respective tracks or sections of tracks are also to be found on both sides of the other lifting devices 116. Carriage 122 carries on both of its sides a pair of rollers 128, only one of which is shown in FIGS. 9 and 10. These rollers roll on the tracks 26 and are rotatably arranged on axles 130 fixedly attached to the carriage 122. Through this arrangement of rollers and tracks the force to be exerted by air cylinders 118 for achieving the shifting movement of the carriage is largely diminished. This arrangement of rollers and tracks furthermore guarantee the stable support of lifting device 116.

Usually, the second grate is returned to the initial position in accordance with FIG. 9 after having completed the movement cycle. It is returned to a position below the first grate 102. Thus, the fiber bale is carried by the first grate 102 during the time when the opening roller of the bale opening machine is being moved transversely across the row of bales to remove and open the fibers closest to the axis of the roller. As a rule, there is sufficient friction between the fiber bale and the rods 102 of the first grate due to the fiber bale's weight to prevent the backwardly directed reactive forces from causing a returning movement of the fiber bale. If any doubts arise in this connection, it is possible, as indicated in FIG. 9, to arrange special protrusions or elevations 132 on the surface of the longitudinal rods 108 of the first grate in order to increase the resistance against a returning movement of the fiber bales. A side view would reveal the elevations 132 as having the shape of a sawtooth.

Since the reactive forces are not very large during the oblique opening, it is possible that the upper side of the second grate in its descended position need not necessarily be below the supporting area (i.e. the upper side) of the first grate. It is also possible that these surfaces may be at the same height or even that the upper side of the second grate in its descended position is slightly higher than the upper side of the first grate. What is necessary is that the second grate engage the bales sufficiently to shift them forwardly along the length of the first grate. One must bear in mind that the bales consist of soft material which will slightly deform under the bale's weight so that, when measures are taken for increasing the friction on the surface of longitudinal rods 102 compared with the friction on the longitudinal rods 112, such an arrangement would be feasible. Therefore, language in the claims or other portion of this application indicating that the initial position may either be below or at approximately the same height as the supporting surface of the supporting member, is intended to be understood in such a manner that the surface of the second grate in its initial position may also lie slightly above the surface of the first grate. It is important that when the second grate is lifted, the weight of the fiber bale is mainly borne by the second grate. Furthermore, the longitudinal rods 104 of the second grate may comprise elevations for increasing friction if this is necessary for ensuring the displacement movement.

In the arrangement of FIGS. 6–10, the lifting and shifting movements are effected by two different devices. It is also possible that only one single device performs the two movements. Such an embodiment is outlined by way of example in FIGS. 11 to 13.

In this particularly preferred embodiment, a wedge 142 is used for performing the lifting and shifting movement, said wedge being movable in the direction of displacement 106 by means of an air cylinder 140. For this purpose wedge 142 is connected to piston rod 144 of air cylinder 140. Both the wedge, the air cylinder and the other mechanism are located in a U-shaped track 146 whose transverse frame is attached to the floor by means of bolts 148. A cross-section through this U-shaped track 146 can be seen particularly well in the cross-sectional drawing in accordance with FIG. 13.

Wedge 142 comprises a generally horizontal underside 150 and an oblique upper side 152. On the transversal frame of the U-shaped track 146 a supporting member 154 is provided. This supporting member carries two pairs of rollers 156 and 158 located at a distance from each other in the direction of displacement 106. The two back rollers 158 of the back pair of rollers are to be seen in FIG. 13. In this view one can see that the rollers of each pair of rollers are arranged on the left and right side of the wedge. Components 160 are flange components which ensure the lateral guidance of the wedge. By providing the pairs of rollers 156 and 158, a more or less friction-free guidance of wedge 142 is ensured, thus requiring less force to be exerted by air cylinder 140.

Above wedge 142 a further pair of rollers 162 are rotatably arranged on an axle 164 attached to a disc 166. The disc 166 is in turn attached via intermediate members 168 to disc component 124 connected to the second grate (not shown) via transversal rod 114. Next to the oblique surface of the wedge, there are further flange components 170 which ensure the lateral guidance of rollers 162. Thus, the arrangement is one in which a movement of wedge 142 in the direction of displacement 106 by means of the air cylinder 140 leads, due to the oblique surface 152, to a lifting of the pair of rollers 162 and thus the second grate.

Figure 13:
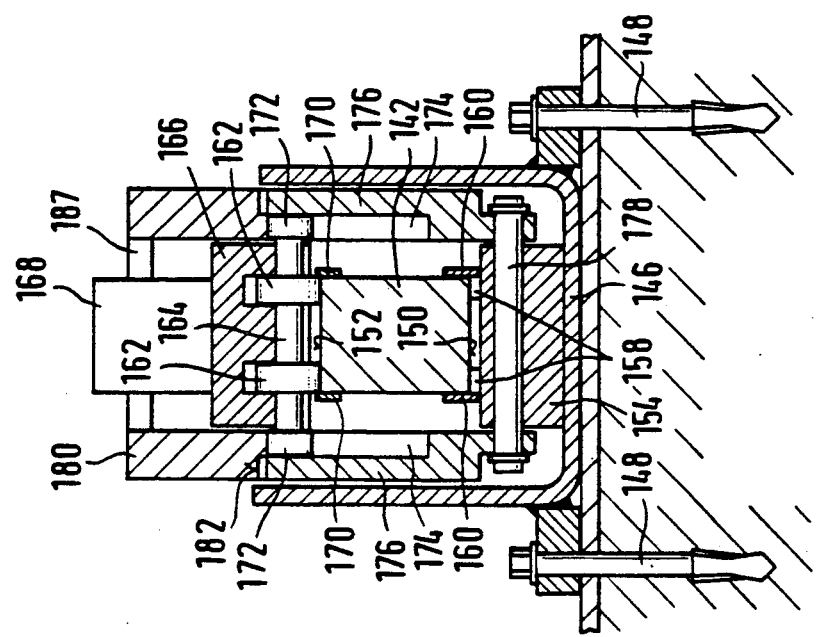
FIG. 13 shows a cross-section through the arrangement according to FIG. 11 along the cutting plane XIII—XIII.

FIG. 13 further shows that the ends of axle 164 project over the lateral edges of disc 166 and carry further rollers 172. The rollers 172 are able to move, according to the lifting or lowering movement of the pair of rollers 162, in a vertically arranged groove 174 of a fixing device 176. The fixing device 176 is attached below the wedge to an axle 178 rotatably arranged within the supporting member 154 between the pairs of rollers 156 and 158. This axle 178 lies in a horizontal plane and is at right angles to the direction of displacement 106. It forms a tilting axis for the fixing device 176.

Tilting movement of the fixing device 176 about a geometrical axis defined by the tilting axis may be prevented by a catch member 180, the ends 182 of which are seated in a catch receiver 183 formed in fixing device 176. At the upper end of the lifting movement, however, rollers 172 touch the lower side of the catch lever 180 and, in the final stage of the lifting movement, these rollers 172 lift the ends of said catch lever out of the catch receiver. This enables the fixing device to perform a tilting movement about the geometrical axis of 178 due to the weight on the axle of both the second grate and the fiber bale. The tilting movement is stopped by an adjustable stop 184. Since the system always strives to move to a condition with lower potential energy, tilting movement in the desired direction is achieved by the obliquity of surface 152.

Stop 184 limits the amount of the tilting movement performed by fixing device 176 and thus defines the length of the shifting step. Stop 184 is displayed here as a bolt. This arrangement is practical in day-to-day operations and also allows fine-tuning of the feeding step. However, an automatically adjustable stop may be provided. For example, a suitably controlled electric motor may be used to give rotatory movement of the stop bolt. Such an arrangement would allow selecting and adjusting the length of the feeding step by the controls of the machine.

The concrete arrangement of the catch lever 180 can particularly be seen in FIG. 11. The catch lever has the form of two articulated arms which are parallel to each other and which are coupled to track 146 in the joining area 186. They are connected to each other by means of a transversal rod. Pull-back spring 188 strives to make the catch lever snap into catch receiver 183 again by exerting a counter-clockwise turning moment upon the catch lever in the direction of arrow 190. The pushback spring is arranged in this example as a helical spring and cooperates with a guiding rod 192 which, with some play, extends through a guiding opening 194 at the lower end of the catch lever 180. The helical spring 188 extends between two disc-like abutments 196 and 198 of which at least abutment 198 is movable. Guiding rod 192 is attached at its front end to the side wall of the U-shaped track 146. On its free end behind catch lever 180, there is a disc-like stop 200 which limits the swiveling movement of catch lever 180.

Behind the vertical leg 202 of the catch lever there is a switch 204, the condition of which tells the machine control whether the catch lever is locked in the fixing device.

Below the adjustable stop 184 for limiting the tilting movement of the fixing device, there is a further pushback spring 206 guided on a pin 208. The task of this spring is to urge the fixing device 176 back into its initial position after the lowering the second grate by movement of wedge 142 by means of air cylinder 140 in the direction opposite of the direction of displacement 106. As movement about the geometrical axis of tilting axle 178 proceeds, the catch lever snaps in again.

A movement cycle of the embodiment in accordance with FIG. 11 to 13 is as follows. At the beginning, wedge 142 is displaced far to the right so that the pair of rollers 162 is located at the lower end of the wedge surface 152, i.e. in the position 162' indicated in FIG. 11 by the short dashes. In other words, air cylinder 150 attached to track 146 at 210 is in the retracted position. Fixing device 176 is in the vertical position and the locking end of catch lever 180 is to be found in the catch receiver 183.

By extending air cylinder 140, its piston rod 144, which is protected against dust and flying fibers by means of sleeve 145, is extended and pushes wedge 142 forward in the direction of displacement 106. The rollers of the pair of rollers 162 now roll along the wedge surface 152 and are thus lifted from the initial position 162' to the lifted position of FIG. 11. During this lifting movement, the second grate also is lifted so that the weight of the fiber bales now rests on this second grate.

At the end of the lifting movement, catch lever 180 is turned clockwise because the pair of rollers 162 come in contact with the locking end of the catch lever, whereupon the catch lever is lifted from the catch receiver. The release of the catch lever is reported to the machine control by switch 204 and further feeding of air cylinder 140 is stopped. When the catch lever 180 releases the fixing device 176, it tilts forward, due to the inclination of surfaces 152, under the influence of the weight of the second grate and the bales. Thus, the second grate moves forward a distance established by the adjustment of stop 184.

As soon as the fixing device pushes against stop 184, a further signal is sent to the machine control by a switch not displayed here, whereupon the retracting movement of air cylinder 140 is ordered. Instead of using a second switch, the retracting movement of the air cylinder may take place with a predetermined delay after activating switch 204. During the retracting movement of air cylinder 140, wedge 142 of FIG. 11 is pulled to the right and the pair of rollers 162 rolls down the wedge surface 152. Simultaneously, a lowering movement of the second grate occurs. When the weight of the fiber bale is borne by the first grate again, push-back spring 206 is in position to tilt the fixing device back into the vertical position, and the end of catch lever 180 snaps back into the catch receiver 183. The respective rotary movement of catch lever 180 is determined by switch 204 and any further activation of the air cylinder 140 is stopped.

As can be seen in the left part of FIG. 11, the wedge 142 is arranged as a double wedge and comprises a second wedge surface 212 which is oppositely slanted to wedge surface 152 in such a manner that together they form a V-shaped surface. By further retraction of air cylinder 140 the pair of rollers 162 may thus be brought from the position 162' to the elevated position, but this time on wedge surface 212. Thus, the second grate is lifted again. In this elevated position the catch lever is again lifted out of catch receiver 183 and fixing device 176 now tilts in a clockwise direction backwards due to the inclination of wedge surface 212. Then, extending air cylinder 140 will cause the wedge 142 to be pushed back so that a lowering movement of the second grate will take place and the catch lever 180 will again snap back into the catch receiver. Hence, the illustrated arrangement also allows for a return movement opposite to the direction 106, to be imparted to the fiber bales. It is necessary, in connection with movements along wedge surface 212, to provide further stops and push-back springs such as those on right side of the fixing device 176 as shown in FIG. 11.

It is possible to only provide one stop 184 on one side of track 146, but two such stops, as can be seen in FIG. 12, is preferable. If desired, catch lever 180 may be arranged only on one side of track 146, but a preferably embodiment may also arrange the catch lever 180 as a double catch lever so that finally two catch ends of both sides of the track snap into the two catch receivers 183, as shown in FIG. 12. The two arms of catch lever 180 are connected with each other via a transversal connecting member (not shown here) and are thus synchronized.

Figure 14:
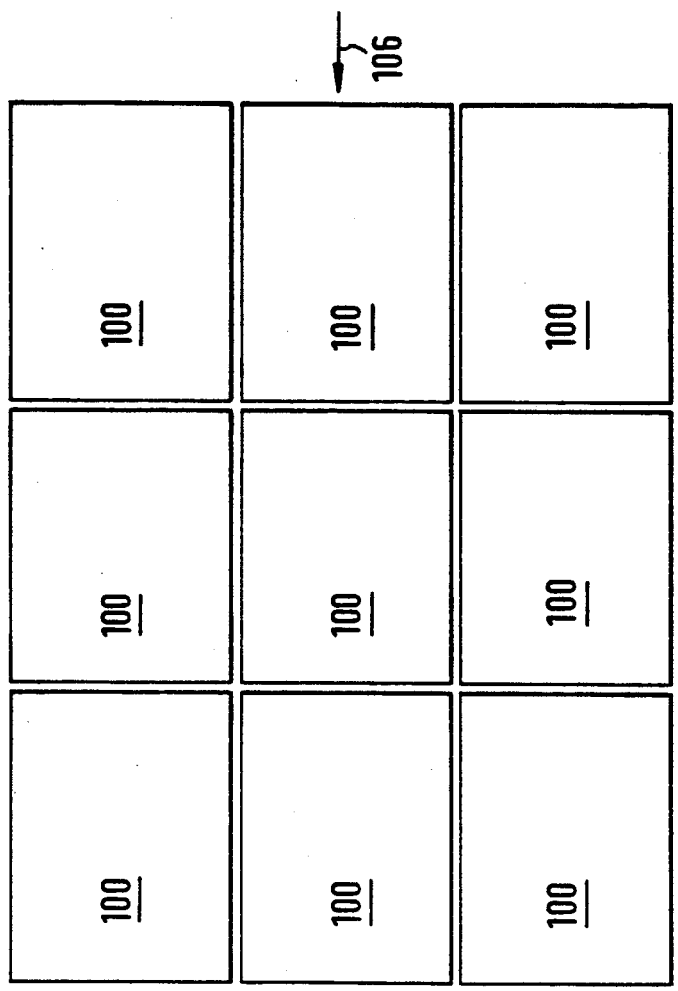
FIG. 14 is a schematic top view of several conveying apparatuses arranged side-by-side.

Finally, FIG. 14 shows in a schematic display nine conveying apparatuses 100 in accordance with the invention which are arranged in three rows side-by-side so that three conveying apparatuses are placed one behind the other. This example shows that the conveying apparatus in accordance with the present invention may be combined within a modular design with similar conveying apparatuses so that the fiber bales may be displaced in the direction of displacement from one conveying apparatus to the next.

The dimensions of the conveying apparatuses may be selected as desired, but practice has shown that it is appropriate for each conveying apparatus to have a width corresponding to the width of two fiber bales and a length also corresponding to the length of two fiber bales. Thus it would be possible, according to the arrangement of FIG. 14, to place six rows of bales, whereby each row would consist of six bales. Nevertheless, the conveying apparatuses may also be designed so that their width is equivalent to the width of an individual fiber bale.

In a practical embodiment, the step length may be selected as desired. Step lengths, however, of less than 1 millimeter and more than 50 millimeter are only necessary in exceptional cases. When performing oblique opening, a displacing movement of 1 millimeter is equivalent to an opening depth of 0.3 millimeters depending on the concrete angle selected for the obliquity of the opening roller. As the common opening depth is, for example, between 2 and 5 millimeters, several steps must be performed by the conveying apparatus for moving the fiber bale forward between the individual opening movements of the oblique roller. By selecting smaller step lengths one may choose different opening depths for the individual rows of bales, thus allowing apportioning of the amounts of fiber to be opened from the rows of bales.

What is claimed is:

1. In fiber bale opening apparatus, bale conveying apparatus comprising
   a stationary grate unit having a first plurality of elongated bale contacting members spaced laterally from one another with their upper surfaces located generally in a plane for bearing against the bottom of said bale,
   a movable grate unit having a second plurality of spaced apart elongated bale contacting members generally parallel to said first plurality of elongated members and being disposed in interdigitated relation to said first plurality of elongated members, the upper surfaces of said second plurality of elongated members being located generally in a plane for bearing against the bottom of said bale,
   means for supporting said movable grate unit for movement relative to said stationary grate unit in a direction having a vertical component so that said second plurality of elongated members may be lowered below the bottom of a bale supported on said first plurality of elongated members or raised into supporting relation to said bale, and
   means for moving said movable grate unit relative said stationary grate unit so that said movable and stationary grate units alternately support said bale and so that said movable grate unit shifts longitudinally while it is in supporting relation to said bale to move said bale longitudinally in stepwise fashion.

2. Apparatus according to claim 1 including an opening roller for opening the bale, said opening roller having means for moving across the bale transversely of the direction of longitudinal movement of the bale, said means for moving said movable grate unit operating said movable grate unit such that the bale is stationarily supported while said opening roller moves transversely across the bale.

3. Apparatus according to claim 2, wherein said opening roller is rotatable about an axis inclined in the direction of longitudinal movement of the bale.

4. Fiber bale opening apparatus comprising an opening roller positioned to contact from above at least one bale of fibers to remove fiber flocks therefrom, said bale having a longitudinal axis and a transverse axis, said roller being rotatable about an axis inclined downwardly relative to the longitudinal axis of said bale and being bodily movable across said bale in directions generally parallel to said transverse axis of said bale; and means for supporting said bale from below and for shifting said bale in a forward direction toward said roller and generally parallel to the longitudinal axis of said bale, said means including first bale contact means having a first plurality of elongated members extended generally in the direction of the longitudinal axis of said bale and being spaced apart laterally from one another with their upper surfaces located generally in a plane for bearing against the bottom of said bale, second bale contact means having a second plurality of spaced apart elongated members generally parallel to said first plurality of elongated members and being disposed in interdigitated relation with the elongated members of said first plurality and with their upper surfaces located generally in a plane for bearing against the bottom of said bale, and means for moving at least one of said contact means relative to the other of said contact means in directions having vertical and horizontal components such that said first and second contact means alternately support said bale and at least one of said contact means shifts rearwardly while it is out of supporting relation to said bale and shifts forwardly while it is in supporting relation to said bale to shift said bale in said forward direction toward said opening roller.

5. A conveying system for stepwise displacement of fiber bales with respect to an opening roller of a bale opening machine, said conveying system comprising a plurality of conveying apparatuses, each said conveying apparatus comprising at least one stationary supporting unit for supporting a fiber bale; and at least one shifting device arranged for performing a repetitive movement cycle starting from an initial position not lower than the height of a supporting surface of the supporting unit and returning back to such initial position, said movement cycle comprising a first section directed upwards and forwards and a second section directed downwards and backwards, said conveying apparatus, when viewed from above, being of rectangular shape, said plurality of conveying apparatuses being arranged in rows to form a bale feeding device for a bale opening machine, each conveying apparatus also including means for reversing the movement cycle.

6. Conveying apparatus according to claim 3, wherein the length of the first section in the direction of bale displacement, starting out from the initial position, lies between 1 and 50 millimeters.

7. A conveying apparatus in combination with a bale opening machine for stepwise displacement of fiber bales with respect to an opening roller of said bale opening machine, said conveying apparatus comprising at least one stationary supporting unit for supporting the fiber bale; and at least one shifting device arranged for performing a repetitive movement cycle starting from an initial position not lower than the height of a supporting surface of the supporting unit and returning back to such initial position, said movement cycle comprising a first section directed upwards and forwards and a second section directed downwards and backwards, said opening roller being rotatable about an axis inclined in a direction of displacement of the bale and wherein said opening roller transversely with respect to a direction of displacement of the bale.

8. Conveying apparatus according to claim 4, wherein said movement cycle is reversible when desired for imparting a reverse shifting movement to said bale in the opposite direction.

9. Conveying apparatus according to claim 4, wherein said unit is in the form of a first grate having a plurality of supporting members parallel to and spaced a distance apart from one another.

10. Conveying apparatus according to claim 6, wherein said shifting device includes a carrier in the form of a second grate having rods arranged between the supporting members of the first grate.

11. Conveying apparatus according to claim 4, wherein said shifting device comprises a carrier for carrying the fiber bale during at least a part of the first section.

12. Conveying apparatus according to claim 8 wherein said shifting device comprises at least one lifting device for lifting and lowering the carrier.

13. Conveying apparatus according to claim 9, included a shifting mechanism working independently from the lifting device.

14. Conveying apparatus according to claim 9, wherein said lifting device includes an inflatable bellows.

15. Conveying apparatus according to claim 11, wherein said inflatable bellows is arranged on a rolling carriage and carries a grate.

16. Conveying apparatus according to claim 12, wherein said shifting device is an extendable and retractable air cylinder.

17. Conveying apparatus according to claim 12, wherein said carriage comprises rollers running on tracks.

18. Conveying apparatus according to claim 12, wherein said shifting device is an electrically driven threaded spindle with a ball nut.

19. Conveying apparatus according to claim 4, wherein said shifting device comprises a lifting mechanism with an integrated shifting mechanism.

20. Conveying apparatus according to claim 15, wherein said shifting device comprises a movable wedge.

21. Conveying apparatus according to claim 16, wherein said wedge is a double wedge with oppositely slanted wedge surfaces allowing movement in the direction of bale displacement by reason of one of the wedge surfaces and movement in the opposite direction by reason of the other wedge surface.

22. Conveying apparatus according to claim 16, wherein said shifting device includes a fixing device mounted for swiveling movement about a axis extending laterally of said direction of bale displacement, a catch releasably connected to said fixing device for preventing said swiveling movement, a roller mounted in said fixing device and guided for up-and-down movement relative thereto, said roller arranged for moving the bale upwardly, said wedge arranged for movement in the direction of bale displacement for moving said roller upwardly in said fixing device to lift the bale, and means for releasing said catch when the bale has been lifted, to enable said fixing device to swivel in a direction for moving the bale in said direction of bale displacement.

23. Conveying apparatus according to claim 22, including an adjustable stop to limit the swiveling movement of the fixing device.

24. Conveying apparatus according to claim 24, including a readjusting device for re-engaging said catch after said shifting device has lowered the bale.

25. Conveying apparatus according to claim 20, wherein said readjusting device comprises at least one spring.

26. Conveying apparatus according to claim 22, wherein said roller is provided with an axle attached to a bale carrier for acting thereon.

27. Conveying apparatus according to claim 22, wherein said catch is released by said roller.

28. Conveying apparatus according to claim 23, wherein said catch is formed by a turnable and spring-loaded catch lever which engages in catch receiver located at an upper end of the fixing device.

29. Conveying apparatus according to claim 24, including switch means for sensing the release and/or renewed locking of the catch.

30. Conveying apparatus according to claim 22, including a second roller arranged with respect to the first mentioned roller so that the two individual rollers are disposed at a distance from one another on an axle and roll on respective bearing surfaces of the wedge, said axle having end sections extending through said roller and into additional rollers guided in the fixing device, said axle being attached to a bale carrier.

31. Conveying apparatus according to claim 22 including supporting rollers arranged below the wedge, said wedge moving on said supporting rollers.

32. Conveying apparatus according to claim 27, wherein at least one said rollers is formed by rolling bearings.

33. Conveying apparatus according to claim 22, wherein an air cylinder is provided for adjusting the wedge.

* * * * *